(12) United States Patent
Cole

(10) Patent No.: US 8,059,530 B1
(45) Date of Patent: Nov. 15, 2011

(54) SYSTEM AND METHOD FOR CONTROLLING NETWORK ACCESS

(75) Inventor: Terry L. Cole, Austin, TX (US)

(73) Assignee: Globalfoundries, Inc.

( * ) Notice: Subject to any disclaimer, the term of this patent is extended or adjusted under 35 U.S.C. 154(b) by 994 days.

(21) Appl. No.: 11/240,311

(22) Filed: Sep. 30, 2005

(51) Int. Cl.
H04J 1/16 (2006.01)
H04J 3/14 (2006.01)
H04L 1/00 (2006.01)
H04L 12/26 (2006.01)

(52) U.S. Cl. .......................... 370/229; 370/230; 370/232

(58) Field of Classification Search .................. 370/229, 370/230, 232, 235
See application file for complete search history.

(56) References Cited

U.S. PATENT DOCUMENTS

| | | | | |
|---|---|---|---|---|
| 5,694,390 A * | 12/1997 | Yamato et al. | ................ | 370/230 |
| 6,118,834 A * | 9/2000 | Rasanen | ....................... | 375/372 |
| 6,850,965 B2 * | 2/2005 | Allen | ........................... | 709/203 |
| 7,016,948 B1 * | 3/2006 | Yildiz | ........................... | 709/221 |
| 2002/0087674 A1 * | 7/2002 | Guilford et al. | ............. | 709/223 |
| 2004/0117426 A1 | 6/2004 | Rudkin et al. | | |
| 2004/0139179 A1 * | 7/2004 | Beyda | ............................ | 709/221 |
| 2004/0190547 A1 * | 9/2004 | Gordy et al. | .................. | 370/463 |
| 2005/0066166 A1 | 3/2005 | Chin et al. | | |
| 2005/0114663 A1 * | 5/2005 | Cornell et al. | ................ | 713/168 |

FOREIGN PATENT DOCUMENTS

EP 0 981 223 A1 * 2/2000
WO WO 2004/080024 A1 * 9/2004

OTHER PUBLICATIONS 802.11F, "IEEE Trial-Use Recommended Practice for Multi-Vendor Access Point Interoperability via an Inter-Access Point Protocol Across Distribution Systems Supporting IEEE 802.11 Operation", Jul. 14, 2003, IEEE, all pages.*

* cited by examiner

*Primary Examiner* — Kwang B Yao
*Assistant Examiner* — Adam Duda

(57) ABSTRACT

A network tap device may include a processor, a first network interface responsive to the processor a second network interface responsive to the processor, the second network interface configured to provide wireless network access, and memory accessible to the processor. The memory may include a network access rule. The processor may be operable to permit network traffic to flow between the first network interface and the second network interface based at least in part on network traffic in a network coupled to the first network interface in accordance with the network access rule.

19 Claims, 3 Drawing Sheets

SYSTEM AND METHOD FOR CONTROLLING NETWORK ACCESS

FIELD OF THE DISCLOSURE

This disclosure, in general, relates to systems and methods for controlling access to networks.

BACKGROUND

Businesses and consumers are increasingly establishing local area networks in places of business and residences. Typically, such local area networks connect to a wide area network or to a service provider that provides access to a global network, such as the Internet. Under typical network protocols, devices connected to a local area network intermittently access the local area network to send and receive data packets.

In addition to using traditional business and residential devices, users are turning to portable devices that access networks through wireless protocols. Exemplary user devices include personal digital assistants (PDA), mobile telephones, and laptops, each having a wireless data interface using wireless protocols, such as Bluetooth®, IEEE 802.11a, IEEE 802.11b, and IEEE 802.11g. Such devices may access wireless local area networks to provide, for example, email access, web browser functionality, and Internet access for applets.

In general, the networks are accessed on demand, leaving periods of time in which the networks have little or no traffic. As a result, a particular portion of a local area or wide area network can be heavily utilized at specific instances of time, while a different portion of the local area or wide area network is lightly used.

A service provider may provide access to the Internet. In concentrated population centers, a service provider may provide network service to many businesses and residences. Depending upon the time of day and various functions associated with a business having network access, traffic on a particular local area network and on the service provider's network as a whole may vary. In addition, the type of access and demand for access at a particular time may vary by time of day or day of the week.

As such improved systems and methods for controlling network access and network traffic would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In a particular embodiment, the disclosure is directed to a network device including at least two network interfaces and a control module configured to couple the at least two network interfaces based at least in part on network traffic in a network connected to one of the at least two network interfaces in accordance with a network access rule. The first network interface may be a wired network interface and the second network interface may be a wired or wireless interface. In one embodiment, the controller monitors network traffic statistics of the network connected to one of the network interfaces and permits or prevents network traffic between the at least two network interfaces in accordance with a network access rule.

A network tap device may include a processor, a first network interface responsive to the processor a second network interface responsive to the processor, the second network interface configured to provide wireless network access, and memory accessible to the processor. The memory may include a network access rule. The processor may be operable to permit network traffic to flow between the first network interface and the second network interface based at least in part on network traffic in a network coupled to the first network interface in accordance with the network access rule.

A data communication system may include a data network, a network traffic shaping device connected to the data network and connected to a wireless network interface, and a controller connected to the data network and the network traffic shaping device. The controller may be configured to determine a network traffic parameter associated with the data network. The controller may be configured to manipulate the network traffic shaping device to permit network traffic between the data network and the wireless network interface based at least in part on the network traffic parameter.

A data communication system may include a first network portion, a second network portion, and a first network tap device connected to the first network portion. The first network tap device may include a first wireless network interface and may be configured to permit communication between the first network portion and the first wireless network interface based at least in part on a first network access rule and network traffic associated with the first network portion. The data communication system may also include a second network tap device connected to the second network portion. The second network tap device may include a second wireless network interface and may be configured to permit communication between the second network portion and the second wireless network interface based at least in part on a second network access rule and network traffic associated with the second network portion.

Figure 1:
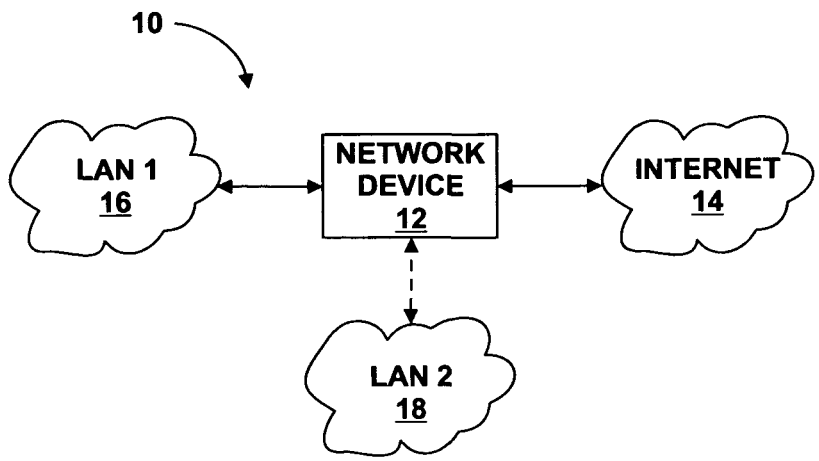
FIG. 1 includes an illustration of an exemplary data network.

In one exemplary embodiment, a network device is connected to a data network and controls access to the data network based at least in part on a network access rule. FIG. 1 includes an illustration of an exemplary network 10 including a network device 12. The network device 12 is coupled to networks, such as the Internet 14, a local area network 16, and a local area network 18. The local area networks 16 and 18 may be wired networks, such as Ethernet 10/100 base T or gigabit Ethernet networks. Alternatively, the local area networks 16 and 18 may be wireless networks, such as networks configured to communicate using protocols, such as Bluetooth®, IEEE 802.11a, IEEE 802.11b, IEEE 802.11g, IEEE 802.16, and the like. Access to the Internet 14 may be provided via a cable network, a digital subscriber line (DSL) network, a T1 or T3 network, a microwave network, a WiMax (IEEE 802.16) network, or the like. In a particular embodiment, the local area network 16 is a wired network, such as an Ethernet 10/100 base T network, and the local area network 18 is a wireless network.

In one embodiment, the network device 12 monitors network traffic between networks, such as the Internet 14 and the local area network 16. Based at least in part on the network traffic between the networks 14 and 16, the network device may conditionally permit or prevent network traffic to flow from local area network 18 to one or both of the networks 14 and 16. In a particular embodiment, the network device 12 includes a network tap device configured to monitor network traffic that flows through the device and conditionally couples the local area network 18 to one or both of the local area network 16 and the Internet 14 based at least in part on the network traffic between the networks 14 and 16 in accordance with a network access rule. In another exemplary embodiment, the network device 12 includes a network shaper device and a controller. The controller is configured to monitor network traffic and, based at least in part on the network traffic and a network access rule, direct the traffic shaper to permit or prevent data packets to flow from the local area network 18.

In a particular embodiment, the network device 12 is configured to couple to wired networks and provide a wireless network. For example, the local area network 16 and the access to the Internet 14 may be wired networks and the local area network 18 may be a wireless network provided by the network device 12. Based at least in part on network traffic on the wired networks (14 and 16), the network device 12 may permit or prevent registration of wireless devices of the local area network 18 and may permit or prevent data traffic to flow to the local area network 16 and the Internet 14 in accordance with a network access rule.

Figure 2:
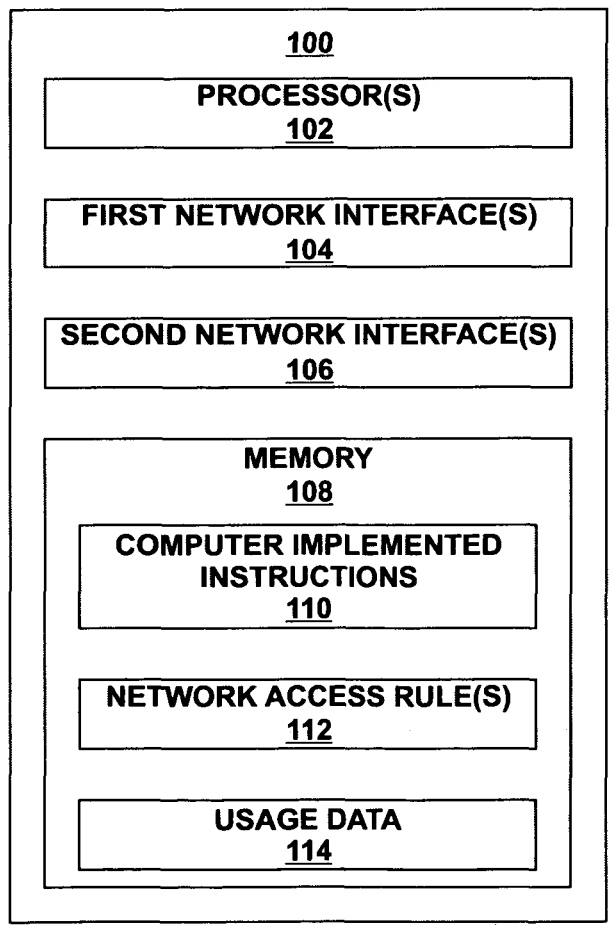
FIGS. 2 and 3 include illustrations of exemplary network devices.

FIG. 2 includes an illustration of an exemplary network device 100 that includes a processor or processors 102, a first network interface(s) 104 and a second network interface(s) 106. The network device 100 also includes memory 108. In one example, the processor 102 is coupled to the first network interface 104, the second network interface 106, and memory 108.

The first network interface 104 may be coupled to wired networks. In one exemplary embodiment, the network device 100 is a network tap device and the first network interface 104 includes first and second network ports configured to couple to the wired network, permitting traffic from the wired network to pass through the network tap. For example, the first network port may connect to a router or server and the second network port may connect to a device. In general, the first network interface 104 provides access to a local area network (LAN), such as an Ethernet 10/100 LAN or a gigabit Ethernet LAN. The local area network may be connected to a service provider via a cable network, a digital subscriber line (DSL) network, a T1 or T3 network, a microwave network, a WiMax (IEEE 802.16) network, or the like.

The second network interface 106 can provide access to a second network, such as a wired or wireless network. In one exemplary embodiment, the second network interface 106 provides network access to devices via a wired network, such as an Ethernet network. In another exemplary embodiment, the second network interface 106 provides a wireless network, such as a wireless network conforming to standards including Bluetooth®, IEEE 802.11a, IEEE 802.11b, IEEE 802.11g, IEEE 802.16, or the like. In particular embodiments, the second network interface 106 includes a wireless network router or has access to a wireless network router.

The memory 108 can include user modifiable memory or read only memory. Exemplary embodiments of the memory 108 include one or more of flash RAM, synchronous dynamic RAM (SDRAM), static RAM (SRAM), Dynamic RAM, and the like. The memory 108 includes instructions 110 operable by the processor 102 to perform network traffic analysis and to control network traffic between the second network interface 106 and the first network interface 104. The memory 108 further includes a set of one or more network access rules 112 and may also include usage data 114. For example, the usage data 114 may reference a pattern of network usage for a network attached to the first network interface 104, such as average network usage and average network usage for a time of day or day of the week. In another embodiment, the usage data 114 may include network usage by particular subscriber devices, such as network traffic from the subscriber device that flows through the network device 100, and may be used to track subscriber devices for billing purposes.

In one exemplary embodiment, the processor 102 accesses the computer implemented instructions 110 from memory 108 to perform network traffic analysis. For example, the network device 100 may analyze network traffic to determine a network traffic parameter, such as a parameter indicative of average network traffic. The average network traffic parameter may include overall network traffic average volume or average network traffic for a particular time of day. The traffic parameter may be stored with the usage data 114. In another example, the system determines a peak usage for traffic, such as a peak usage within a time window. In addition, the system determines current network traffic volume or actual usage. In a further example, the system may determine traffic statistics associated with the network or with the network connected to the first network interface 104 or a network or device connected to the second network interface 106, such as bandwidth, quality of service requirements (e.g., jitter and bandwidth) of traffic being carried.

In a particular embodiment, the processor 102 accesses one or more network access rules 112 from memory 108. Based at least in part on the network traffic analysis and the network access rules 112, the processor 102 permits or restricts communication between the second network interface 106 and the first network interface 104. For example, the processor 102 may prevent communication between the second network interface 106 and the first network interface 104 based at least in part on the network traffic analysis and the network access rule. Alternatively, the processor 102 may couple the second network interface 106 and the first network interface 104 to permit devices connected to the second network interface 106 to communicate with a network connected to the first network interface 104 when the network traffic on the network is low. Similarly, the processor 102 may disconnect the second network interface 106 and the first network interface 104 to prevent devices connected to the second network interface from communicating with the network connected to the first network interface 104 when the network traffic on the network is high. In another embodiment, the processor 102 may permit or prevent the second network interface 106, such as in the case of wireless networks, to register wireless devices or interface with a particular number of wireless devices within the coverage area.

In exemplary embodiments, the network access rules 112 are configured to permit data from the second network interface 106 to pass to a network connected to the first network interface 104 when the total network traffic on the network does not exceed the average network traffic associated with a device connected to the network. In another example, a network access rule 112 is configured to permit network traffic to flow between the first network interface 104 and the second network interface 106 when the total traffic on the network does not exceed a peak usage. In a further exemplary embodiment, the'network access rule 112 is configured to permit traffic to flow to supplement between the actual device usages and an average usage for a particular time of day or week. The average usage of a device, peak usage, and average usage for a particular time of day or week may be stored in the usage data 114. In another example, network traffic may be permitted to flow between the first and second interfaces (104 and 106) to fill in between actual usage at a designated number, such as a traffic threshold. The threshold may be an overall threshold or may be established for different times of the day or week.

In a further embodiment, traffic may be permitted to flow between the first and second network interfaces (104 and 106) based at least in part on the type of devices coupled to the network. For example, the type of device coupled to a network connected to the first network interface 104 may be used to establish an amount of network traffic permitted between the first and second network interfaces (104 and 106). The types of devices may include, for example, a desktop computer, a PDA, a laptop computer, a mobile telephone, a printer, a server, a database server, or a voice-over-IP telephone. In a further example, the device may include a cash register connected to a wireless network, such as a Bluetooth® network. Specifically, different thresholds for network traffic may be applied for networks carrying voice-over-IP traffic than networks including printer traffic. In another example, different time of day procedures may be applied to networks coupled to a desktop computer in contrast with networks coupled to servers. In another example, the type of device coupled to the second network interface 106 may determine whether network traffic is permitted to flow between the first and second network interfaces (104 and 106).

In addition, traffic may be permitted to flow between the first and second network interfaces (104 and 106) based at least in part on whether the data is encrypted. For example, traffic may be permitted when it is encrypted and traffic may be prevented when it is not encrypted. Alternatively, traffic may be permitted when it is not encrypted and traffic may be prevented when it is encrypted.

In another example, traffic may be permitted to flow between the first and second network interfaces (104 and 106) based at least in part on an end point traffic limit. For example, a limited amount of traffic may be permitted to flow between a device connected to the second network interface 106 or connected to a network connected to the second network interface 106 based at least in part on a network access rule 112. Traffic beyond the limit may be prevented from flowing to the device. In one exemplary embodiment, the network access rule 112 is configured to permit network traffic to flow between the first and second network interface based at least in part on a cumulative amount of data transferred to a device connected to the second network interface.

Figure 3:
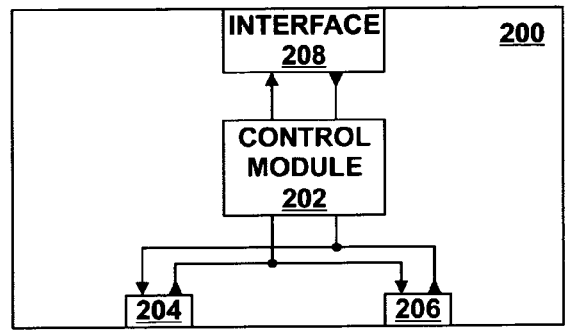

In another exemplary embodiment, FIG. 3 includes an illustration of an exemplary device 200. In a particular embodiment, the exemplary device 200 is a network tap device. The network device 200 includes a control module 202 configured to monitor pass-through network traffic. In the particular embodiment illustrated, the device includes two ports, 204 and 206, configured to couple to a data network. For example, the port 204 may couple to a data network and the port 206 may couple to a network device, such as a computer, printer, server, or another router. The control module 202 monitors traffic between ports 204 and 206 to determine actual network usage and network traffic statistics.

In one exemplary embodiment, the control module 202 includes processors and memory. The memory may include, for example, processor-operable instructions and a network access rule. Based on the traffic statistics, the actual usage and the network access rule, the control module 202 may allow or prevent network traffic to flow between the network interface 208 and the ports, 204 and 206. In one embodiment, the network access rules are provided to the control module 202 via the interface 208 or ports 204 or 206. In another exemplary embodiment, a control interface (not shown) provides or permits communication of traffic statistics and network access rules between the control module 202 and external devices, such as monitoring systems.

The network interface 208 may be a wired or wireless interface. In a particular embodiment, the network interface 208 is a wireless interface conforming to standards, such as Bluetooth®, IEEE 802.11 (a, b, or g), or the like. For example, the network interface 208 may access a wireless network router or may include a wireless network router. Alternatively, the network device ports 204 and 206 may include attached cables, such as an Ethernet cables.

Figure 4:
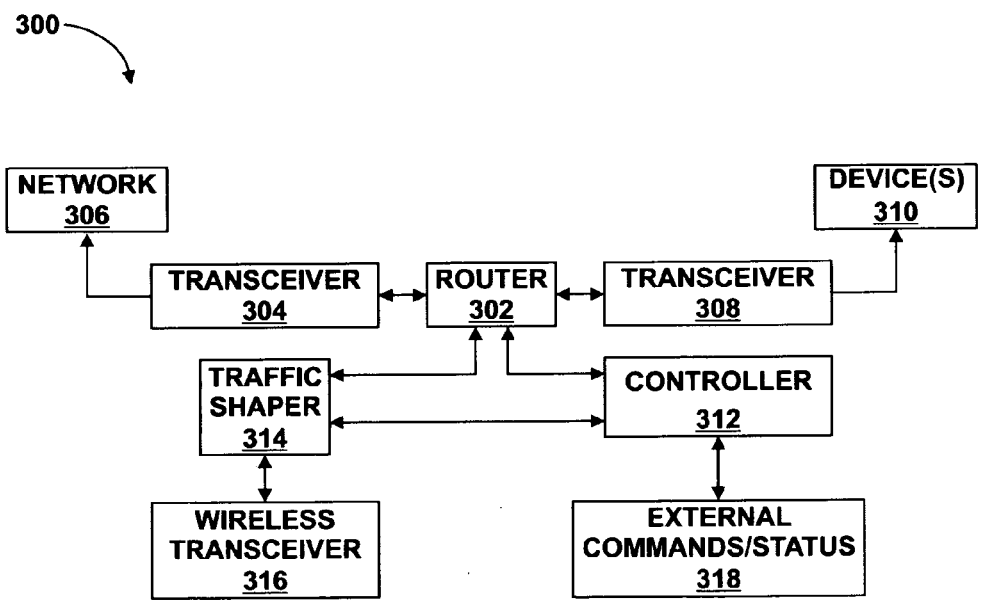
FIGS. 4 and 5 include illustrations of exemplary data networks.

In another exemplary embodiment, FIG. 4 illustrates an exemplary system 300. As illustrated, a router 302 is connected via a transceiver 304 to a network 306. The router 302 is also connected to device or devices 310 via a transceiver or transceivers 308. A controller 312 accesses the router 302 to determine network usage and traffic statistics. In one exemplary embodiment, the router 302 determines the network traffic statistics and communicates the network statistics to the controller 312. In another exemplary embodiment, the controller 312 monitors network traffic and determines the network traffic statistics.

In one embodiment, the controller 312 analyzes network traffic to determine traffic statistics and actual network usage and determines a network traffic limit. The controller may include a network access rule with which it establishes the network traffic limit based at least in part on the traffic statistics and actual usage. Network access rules may be provided, for example, by an external system 318 that provides commands. In addition, the external system 318 may retrieve network traffic statistics and status reports from the controller 312.

The controller 312 provides the traffic limit to a traffic shaper 314 or manipulates the traffic shaper 314 to permit or prevent traffic flow. For example, the traffic shaper 314 may permit traffic to flow between the wireless transceiver 316 and the router 302 as directed by the controller 312.

Such a system 300 may be useful to conditionally provide network access to wireless devices while preventing network overload. For example, a business may conditionally provide wireless access to the business' network for customer use only when bandwidth is available to prevent network overload and loss of critical business functions. In a particular embodiment, a business having limited bandwidth, such a business connected to a service provider via a modem or DSL, may restrict customer access to the system 300 during peak business hours while permitting access during off peak hours.

While illustrated as separate components, the transceivers 304 and 308, the router 302, the traffic shaper 314, the controller 312, and the wireless transceiver 316 may housed together, separately, or in various combinations. For example, the controller 312, the traffic shaper 314, and the wireless transceiver 316 may be housed together. In another exemplary embodiment, the transceivers 304 and 308, the router 302, the traffic shaper 314, the controller 312, and the wireless transceiver 316 are housed together. In a further configuration, the traffic shaper 314 and wireless transceiver 316 are housed together.

In general, the system 300 illustrated in FIG. 4 forms a portion of a network. One or more of such systems 300 or one or more network devices, such as the network device illustrated in FIG. 3, may be used to balance network load between one or more portions of a network or one or more local area networks that are coupled to a service provider. The controller may also be coupled to a second traffic shaper (not shown)

having access to a second network portion and control traffic flow between a wireless network and the second network portion based on network access rules. In addition, the controller may be coupled to a router connected to the second network portion to determine network usage and traffic statistics associated with the second network portion.

Figure 5:
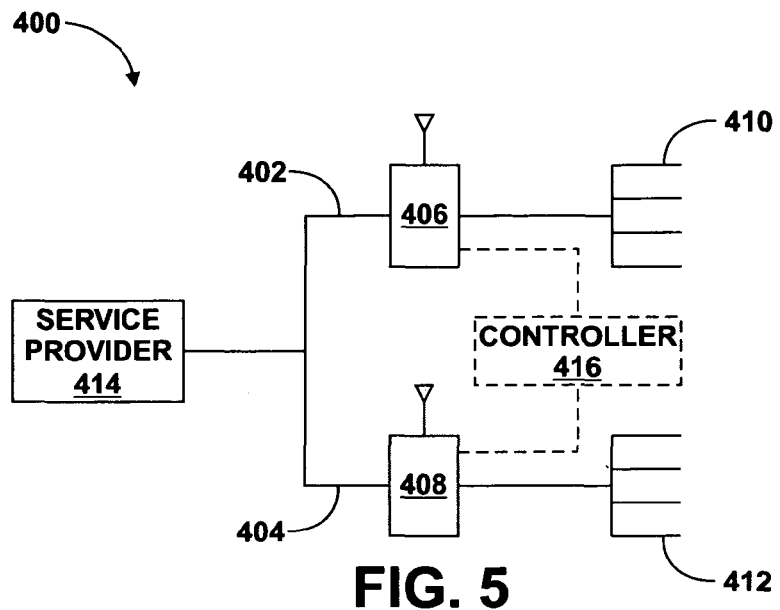

FIG. 5 includes an illustration of an exemplary embodiment of a network 400. The network 400 includes a first network portion 402 and a second network portion 404. In one example, a network tap 406 is coupled to the first network portion 402. The network tap 406 can monitor traffic on the network portion 402 from the devices 410 and permit or prevent access to the first network portion 402 by wireless devices (not shown) via a wireless interface based on the network traffic. In another example, a portion of the network 404 includes a network tap 408 that monitors actual traffic of the devices 412. The network tap 408 can permit wireless access to the portion of the network 404 by wireless devices (not shown) based on the actual network usage of the network portion 404.

In one exemplary embodiment, the portions of the network (402 and 404) are portions of a local area network. In another exemplary embodiment, the portions of the network (402 and 404) access a common service provider 414. As different portions of the network (402 or 404) may have devices (410 and 412) having different functions and network usage profiles, actual usage on the portions of the network (402 and 404) may differ significantly at particular times. For example, network usage may be particularly high on the network portion 402 while network usage is low on the network portion 404. At another time, network usage may be high on the network portion 404 and low on the network portion 402. To balance network traffic or prevent overloading a network portion (402 or 404), wireless devices (not shown) may be given network access to different portions of the network (402 and 404) via wireless interfaces of the network taps 406 and 408 at different times of day. When one portion of the network has particularly high usage, wireless network traffic may be diverted to another portion of the network. For example, when usage is high in the network portion 402, wireless network traffic of wireless devices may be diverted to the network portion 404.

The network 400 may further include a controller 416. The controller 416 may be connected to network taps (406 and 408) or to network routers connected to the network portions (402 and 404). In one exemplary embodiment, the controller 416 manipulates network taps (406 and 408) to balance network traffic between the network portions (402 and 404). In a particular embodiment, the network taps (406 and 408) are configured to provide a single wireless network.

In one particular embodiment, the wireless taps (406 and 408) store usage by particular wireless devices. For example, particular wireless devices may subscribe to a service provided by service provider 414. As such, usage by a particular subscriber device may be monitored by the service provider 414 for billing purposes using data stored on the wireless taps (406 and 408).

Such load balancing between portions of the network (402 and 404) allow wireless devices to access the network, while preventing particular portions of the network from overload or excess usage.

Figure 6:
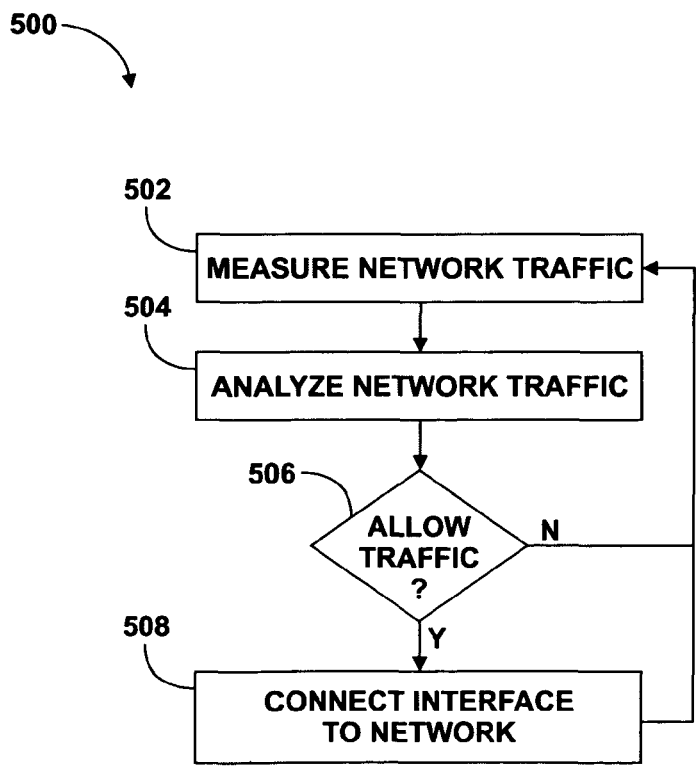
FIG. 6 includes an illustration of an exemplary method for controlling access to a data network.

FIG. 6 includes an illustration of an exemplary method 500 for controlling access to portions of a network. The method 500 includes measuring network traffic, as illustrated at 502. The measured network traffic may be useful in determining network traffic statistics and analyzing network usage. In a particular embodiment, the actual network traffic usage is analyzed in relation to a network access rule, as illustrated at 504.

Based on this analysis, the system determines whether to allow or prevent network traffic between a first network traffic interface and a second network interface, as illustrated at 506. For example, the system may determine whether to allow access from a wireless interface to a network attached to a wired network interface. When network traffic flow is permitted, the system may connect the second interface to the network, as illustrated at 508. However when traffic is disallowed, the system may return to measuring network traffic, as illustrated at 502.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A device comprising:
   a first network interface to couple to a first network;
   a second network interface to couple to a second network;
   a processor to monitor network traffic passed through the device between the first network interface and the second network interface;
   a third network interface responsive to the processor, the third network interface to provide a wireless network; and
   memory accessible to the processor, the memory including a network access rule, the processor to permit network traffic to flow between the first network interface and the third network interface based on the network traffic monitored at the processor in accordance with the network access rule, and a wireless device is to be permitted to register with the device via the third network interface based upon the network access rule, wherein the network access rule is configured to permit registration of a wireless network device via the first network interface based on the network traffic of the first network coupled to the first network interface.

2. A device comprising:
   a first network interface to couple to a first network;
   a second network interface to couple to a second network;
   a processor to monitor network traffic passed through the device between the first network interface and the second network interface;
   a third network interface responsive to the processor, the third network interface to provide a wireless network; and
   memory accessible to the processor, the memory including a network access rule, the processor to permit network traffic to flow between the first network interface and the third network interface based on the network traffic monitored at the processor in accordance with the network access rule,
   wherein the network access rule is to permit network traffic to flow between the first and third network interfaces based on a comparison of network traffic between the first and second network interfaces to an average network traffic between the first and second network interfaces for a particular time.

3. The device of claim 2, wherein the processor is to monitor the network traffic via the first network interface.

4. The device of claim 3, wherein a second network access rule is to permits network traffic to flow between the first and third network interface in response to the network traffic volume of the first network coupled to the first network interface being below a threshold.

5. The device of claim 2, wherein a second network access rule permits network traffic to flow between the first and third network interface based on whether network traffic from the third network interface is encrypted.

6. The device of claim 2, wherein a second network access rule is to permits network traffic to flow between the first and third network interface based on a cumulative amount of data transferred to a device connected to the third network interface.

7. The device of claim 2, wherein the first network interface comprises a wired network interface, and the second network interface comprises a wired network interface.

8. The device of claim 2, wherein the network access rule permits network traffic to flow between the first and third network interfaces based on a time of day.

9. A device comprising:
a processor;
a first network interface responsive to the processor and to couple to a first network;
a second network interface responsive to the processor and to couple to a second network;
a third network interface responsive to the processor, the third network interface to provide a wireless network; and
memory accessible to the processor, the memory including a network access rule, the processor to permit registration of a wireless device and to permit network traffic to flow between the first network interface and the third network based on network traffic to the first network coupled to the first network interface in accordance with the network access rule, wherein the network access rule is configured to permit registration of a wireless network device via the first network interface based on the network traffic of the first network coupled to the first network interface.

10. The device of claim 9, wherein the processor is to monitor the network traffic via the first network interface.

11. The device of claim 9, wherein a second network access rule permits registration of a wireless device in response to network traffic volume of the first network coupled to the first network interface being below a threshold.

12. The device of claim 9, wherein the network access rule is applied based on network traffic of the first network coupled to the first network interface.

13. The device of claim 9, wherein the network access rule is applied based on whether the network traffic from the third network interface is encrypted.

14. The device of claim 9, wherein the network access rule is applied based on a cumulative amount of data transferred to a wireless device via the third network interface.

15. The device of claim 9, wherein the first network interface comprises a wired network interface.

16. The device of claim 9, wherein the processor, further permits network traffic to flow between the first and third network interfaces based on evaluating a time.

17. The device of claim 9, wherein the processor, further permits network traffic to flow between the first and third network interfaces based on evaluating a comparison of network traffic to an average network traffic for a particular time.

18. The device of claim 2, wherein the third network interface is configured to permit registration of a wireless device based on the network access rule.

19. The device of claim 2, wherein the second network interface is to provide a second wireless network.

* * * * *

UNITED STATES PATENT AND TRADEMARK OFFICE
CERTIFICATE OF CORRECTION

PATENT NO. : 8,059,530 B1  Page 1 of 1
APPLICATION NO. : 11/240311
DATED : November 15, 2011
INVENTOR(S) : Terry L. Cole It is certified that error appears in the above-identified patent and that said Letters Patent is hereby corrected as shown below:

At Column 8, Line 67, please change "rule is to permits" to --rule permits--

At Column 9, Line 9, please change "rule is to permits" to --rule permits--

Signed and Sealed this
Tenth Day of July, 2012

David J. Kappos
*Director of the United States Patent and Trademark Office*